(12) United States Patent
Tomobe

(10) Patent No.: US 7,143,200 B2
(45) Date of Patent: Nov. 28, 2006

(54) SEMICONDUCTOR INTEGRATED CIRCUIT

(75) Inventor: Katsuichi Tomobe, Ome (JP)

(73) Assignee: Hitachi, Ltd., Tokyo (JP)

( * ) Notice: Subject to any disclaimer, the term of this patent is extended or adjusted under 35 U.S.C. 154(b) by 164 days.

(21) Appl. No.: 10/849,046

(22) Filed: May 20, 2004

(65) Prior Publication Data

US 2004/0268008 A1    Dec. 30, 2004

(30) Foreign Application Priority Data

Jun. 25, 2003    (JP) .............................. 2003-180750

(51) Int. Cl.
*G06F 3/00* (2006.01)
*G06F 12/04* (2006.01)
(52) U.S. Cl. ........................... 710/9; 710/300; 712/212
(58) Field of Classification Search .............. 710/8–10, 710/26, 62, 100, 300–302, 304; 711/200–202, 711/203, 210, 212, 217, 220
See application file for complete search history.

(56) References Cited

U.S. PATENT DOCUMENTS 4,400,794 A * 8/1983 Koos ........................... 711/202
5,996,032 A * 11/1999 Baker .......................... 710/62
6,128,718 A * 10/2000 Schmisseur et al. ........ 711/212
6,421,755 B1 * 7/2002 Rao .............................. 710/302
6,711,673 B1 * 3/2004 Mitchell et al. ............... 713/1

FOREIGN PATENT DOCUMENTS

JP    11-039249    2/1999

OTHER PUBLICATIONS

PCI Specification, Rev. 2.1, section 3.2.2 (Addressing), Jun. 1, 1995.*

* cited by examiner

*Primary Examiner*—Khanh Dang
(74) *Attorney, Agent, or Firm*—Mattingly, Stanger, Malur & Brundidge, P.C.

(57) ABSTRACT

A semiconductor integrated circuit to be connected to a PCI bus, having a configuration register. The size of an address space mapped to the semiconductor integrated circuit depends on the size of readable and writable region (Fv) of a base address register (30) that the configuration register has. The size of the readable and writable region of the base address register can be changed by a mask circuit (31). The size of a local address space can be set to be variable according to the number of mask bits specified by a mask signal. For example, also in the case where a plurality of PCI devices are used, a memory space mapped to each device can be selectively reduced in size and as such, it is also possible to cope with the case where finite resources are mapped to many PCI devices to construct a system.

3 Claims, 5 Drawing Sheets

| MASK SELECT SIGNAL | MASK SIGNAL | WRITABLE/READABLE BIT | MEMORY SPACE |
|---|---|---|---|
| 0 0 | 111 | B31~B26 | 64MB |
| 0 1 | 110 | B31~B27 | 128MB |
| 1 0 | 100 | B31~B28 | 256MB |
| 1 1 | 000 | B31~B29 | 512MB |

SEMICONDUCTOR INTEGRATED CIRCUIT

CLAIM OF PRIORITY

The present application claims priority from Japanese application JP 2003-180750 filed on Jun. 25, 2003, the content of which is hereby incorporated by reference into this application.

BACKGROUND OF THE INVENTION

The present invention relates to a semiconductor integrated circuit having a configuration circuit such that the resource mapping is defined from the outside of it, and more specifically, it relates to a technique useful, for example, in the applications to PCI (Peripheral Component Interconnect) devices designed for Plug and Play.

PCI bus is designed for Plug and Play, and various settings including the resource mapping to a device to be connected are made by a system, i.e. an OS (Operating System) (see JP-A-11-39249). In this step, a memory space that the device needs depends on the configuration of a base address register in the configuration register that the device has. More specifically, the base address register is composed of low-order bits with fixed logical values and high-order bits with variable logical values. The number of bits with fixed logical values defines the size of a local address region, and a high-order portion of the base address of a local address space is held in a logical-value-variable region. When a system maps a base address to a PCI device, the system writes the data, i.e. the logical value "1," into all bits of the base address register and then reads out values held in the register to automatically calculate the size of an address space that the device needs based on the number of bits into which the logical value "1" cannot be written (the number of low-order bits with fixed logical values in the base address register). After that, the system writes an address into high-order bits with variable logical values in the base address register to map a local address space to the device.

SUMMARY OF THE INVENTION

The inventor examined resource mapping by Plug and Play. In the past, a local address space, which can be mapped as a resource, has been fixed in size depending on the configuration of a related base address register. More specifically, the size of an address space capable of being mapped has depended on the bit number of low-order bits with fixed logical values in the base address register. Thus, the memory space of a device subjected to resource mapping by Plug and Play depends on the hardware configuration of a base address register unique to the device. On this account, when attempts are made to construct various systems, finite resources cannot be mapped flexibly. For example, also in the case where a plurality of PCI devices are used, the memory space to be mapped to each of the devices cannot be reduced in size and as such, it is impossible to cope with attempts to map finite resources to many PCI devices thereby to construct a system.

It is an object of the invention to provide a semiconductor integrated circuit which can accommodate the mapping of finite memory resources or address resources readily and flexibly.

It is another object of the invention to provide a semiconductor integrated circuit which can relatively easily make variable the size of an address space capable of being mapped by Plug and Play, and which can avoid the need to use a complicated process according to a program, etc. and the need to use a circuit of a large logical scale despite making the address space size variable.

The foregoing and other objects of the invention and a novel feature thereof will be apparent from the description hereof and the accompanying drawings.

The general descriptions of typical embodiments of the invention herein disclosed are as follows.

[1] The semiconductor integrated circuit has a configuration circuit, to which resource mapping is defined from outside the circuit. The configuration circuit has: a base address register having a low-order multi-bit region with fixed logical values and a high-order multi-bit region with variable logical values, and utilized for address space mapping; and a limiting circuit for limiting writing and read-out with respect to a part of the multi-bit region on a high-order side of the base address register to the fixed logical value, the part capable of being varied in bit number. In these miconductor integrated circuit, a number of bits with the fixed logical values on a low-order side of the base address register determines a size of the address space, and a value of the address register determines a leading address of the address space.

Therefore, in the case where the number of bits limited by the limiting circuit is small relative to a high-order multi-bit region with variable logical values of the base address register, the number of bits with the fixed logical values on a low-order side of the base address register is increased as a whole. Conversely, the number of limited bits is large, the number of bits with the fixed logical values on the low-order side is decreased as a whole. The size of a local address space capable of being mapped to the semiconductor integrated circuit is proportional to the number of bits with the fixed logical values on the low-order side of the base address register. Therefore, it becomes possible to set a variable size of a local address space capable of being mapped to the semiconductor integrated circuit according to the number of limited bits, in which the number of limited bits is variable. Thus, in cases where attempts are made to construct various systems, finite memory resources or address resources can be mapped flexibly. For example, also in the case where a plurality of PCI devices are used, the memory space to be mapped to each of the devices can be selectively reduced in size and therefore it is impossible to cope with attempts to map finite resources to many PCI devices thereby to construct a system.

In a concrete form of the invention, the limiting circuit is a mask circuit for masking a part of the multi-bit region on the high-order side of the base address register into the fixed logical value based on a piece of mask control information. The number of limited bits depends on the mask control information. The mask circuit carries out the masking, for example, with respect to the information read out from the high-order multi-bit region. Masking may be conducted in writing the base address register.

[2] In a concrete form of the invention, the configuration circuit has a latch circuit for holding the mask control information. The latch circuit may hold the necessary mask control information from outside the circuit for local address mapping.

For example, the latch circuit may latch a value at a given external terminal as the mask control information in response to release of reset with respect to the semiconductor integrated circuit.

When resource mapping is conducted, the control circuit for controlling the configuration circuit controls, in a configuration cycle after release of reset of the semiconductor integrated circuit, the operation (first process) of holding inverted data of the fixed logical values input from outside the circuit in the high-order bits with variable logical values in the base address register; the operation (second process) of outputting outside a value held by the base address register through the mask circuit after the holding; and the operation (third process) of holding data input from outside the circuit in the base address register after the outputting. The host machine identifies the size of local address space required by the semiconductor integrated circuit based on the number of bits of fixed logical values of the data read out from the base address register in the second process with respect to the data written and held in the base address register in the first process in a configuration cycle. The host machine determines mapping of an address space of the identified size to write a leading address of the address space into the base address register during the third process. The address space mapping is thus carried out.

Therefore, the size of a memory space capable of being mapped by Plug and Play can be made variable relatively easily. This needs to use neither a complicated process according to a program, etc. nor a circuit of a large logical scale despite making the memory space size variable.

The configuration circuit for performing the above-described processes in a configuration cycle and the control circuit thereof constitute, for example, a PCI bus interface circuit.

The semiconductor integrated circuit with such PCI bus interface circuit has a central processing unit capable of controlling the PCI bus interface circuit as an external interface circuit, for example.

[3] Another form of the invention partially different in its points of view from the above forms is a semiconductor integrated circuit having: a base address register used for address mapping of a local address space of the semiconductor integrated circuit, a number of low-order bits with fixed logical values of the base address register determining a capacity of the local address space, the base address register capable of being read out and written from outside the semiconductor integrated circuit; and a limiting circuit capable of limiting a part of bits on a high-order side of the base address register to the fixed logical value, the part capable of being varied in bit number, the local address space capable of being varied in capacity.

The limiting circuit limits a value read out from the base address register to the fixed logical value, for example. The logical-value-fixed limitation may be conducted in writing the base address register. In a preferred form of the invention, the semiconductor integrated circuit further has a latch circuit for accepting a piece of control information for specifying a number of bits set to the fixed logical value by the limiting circuit from outside the circuit to hold the piece of control information in response to release of a reset operation of the semiconductor integrated circuit.

DESCRIPTION OF THE PREFERRED EMBODIMENTS

Figure 1:
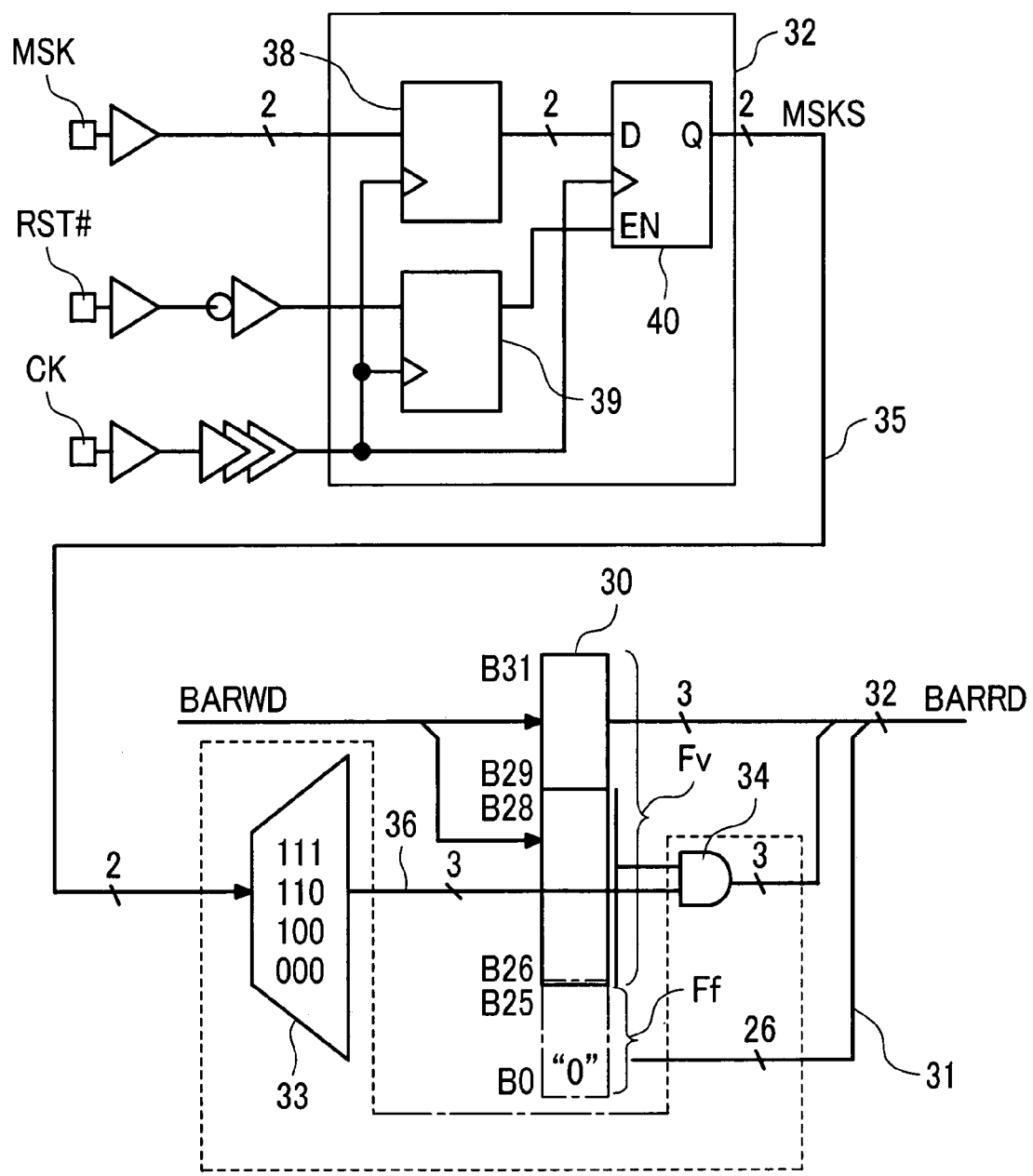
FIG. 1 is a circuit diagram of a logic circuit illustrating a detailed circuit configuration for the address mapping in the configuration circuit.
Figure 2:
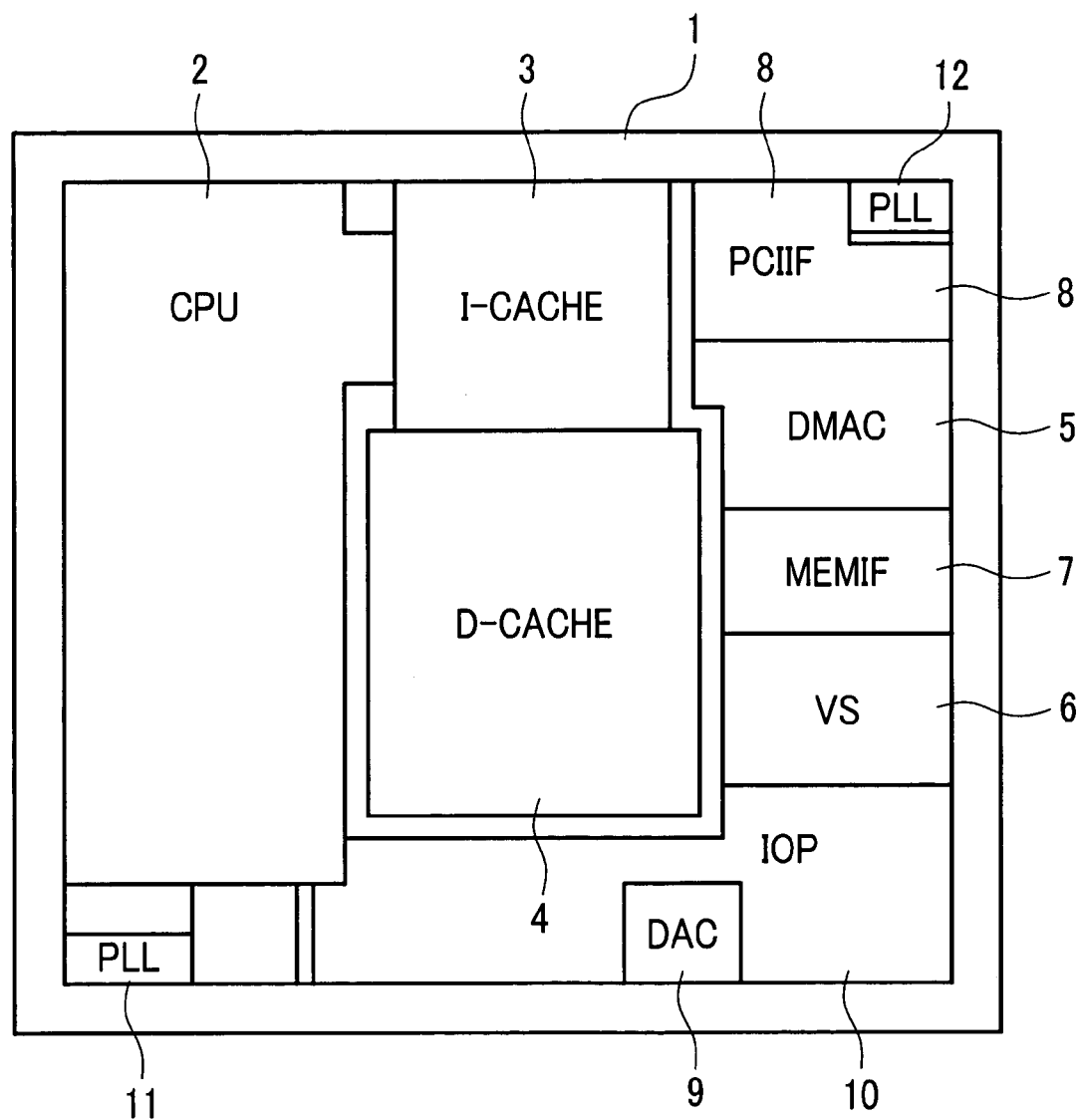
FIG. 2 is a block diagram of a microprocessor according to an example of the invention.

Referring now to FIG. 2, there is shown a microprocessor 1 according to an embodiment of the invention. The microprocessor 1 shown in FIG. 1 is formed on a semiconductor substrate of single-crystal silicon, etc., for example, by a technique of manufacturing CMOS integrated c ircuits. The microprocessor 1 has: a central processing unit (CPU) 2 for decoding a fetched instruction and performing an operation according to the result of the decoding; an instruction cache memory (I-CACHE) 3; a data cache memory (D-CACHE) 4; a DMAC (Direct Memory Access Controller) 5; a video scaler (VS) 6; a memory interface circuit (MEMIF) 7 interfaced with an external memory; a PCI bus interface circuit (PCI IF) 8; a DAC (digital-to-analog converter) 9; an I/O port (IOP) 10; and PLLs (Phase Locked Loop) 11, 12. The PLL 11 produces operation-reference clocks for the CPU 2, etc. The PLL 12 produces operation-reference clocks for the memory interface circuit 7, etc. The microprocessor 1 is placed as a PCI device here. There is no specific limitation, but a SDRAM is used for the external memory primarily.

Figure 3:
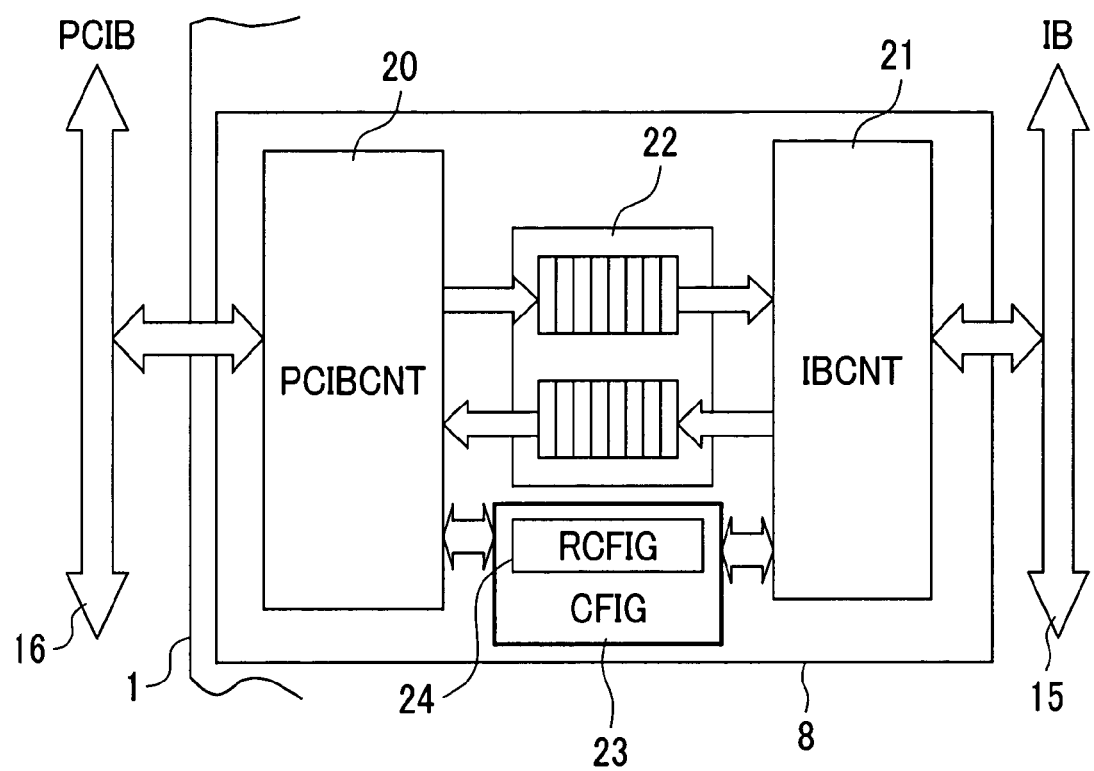
FIG. 3 is a block diagram illustrating a PCI bus interface circuit.

Referring now to FIG. 3, there is shown an example of the PCI bus interface circuit 8 described above. The PCI bus interface circuit 8 is connected to an internal bus (IB) 15 inside the microprocessor 1, whereas it is connected to a PCI bus (PCIB) 16 outside the microprocessor 1. The internal bus 15 is composed of address, data and control signal buses and is connected with the CPU 2, etc. The PCI bus 16 is composed of address, data, interface control signal buses, and the like. Incidentally, the specification of the PCI bus interface is standardized by PCI SIG (PCT Special Interest Group).

The PCI bus interface circuit 8 includes a PCI bus interface control section (PCIBCNT) 20 for carrying out sequential control and bus arbitration of the PCI bus interface; an internal bus interface control section (IBCNT) 21 for controlling the communication with the internal bus 15; an FIFO buffer circuit 22 for absorbing the difference in operating rate of interface between the interface control sections 20 and 21; and a configuration circuit (CFIG) 23 for making the various settings in association with the PCI interface. The settings in association with the PCI interface are held in a configuration register (RCFIG) 24. The configuration register 24 is arranged to be readable and writable through the PCI bus 16 according to a configuration cycle.

Figure 4:
FIG. 4 is an illustration showing a configuration cycle associated with a reset operation.

The configuration cycle is a cycle in which a PCI host machine (not shown) of the PCI bus 16 makes initial settings for PCI devices connected to the PCI bus 16, such as the microprocessor 1, as shown in FIG. 4. In other words, each PCI device has the configuration register 24 and as such, when the PCI host machine of the PCI bus 16 recognizes the PCI device in the configuration cycle, etc., the host machine reads out from the configuration register 24 a class code used for the identification of the vendor ID, device ID and device type thereof to identify the type of the PCI device.

Based on the result of the identification, the PCI host machine performs the mapping of resources including a memory address required to drive the PCI device, an I/O address, an IRQ (Interrupt Request) number, and a DMA channel number. The results of the mapping are stored in the configuration register 24 of the PCI device by the PCI host machine. The PCI device is worked utilizing the resources including a memory address, which are mapped according to the settings of the configuration register 24.

The address mapping with respect to PCI devices in the configuration cycle will be described below in detail.

The detailed circuit configuration for the address mapping in the configuration circuit 23 is illustrated in FIG. 1. For address mapping with respect to the microprocessor 1, the configuration circuit has a base address register (BAR) 30, a mask circuit 31 as a limiting circuit, and a latch circuit 32. The base address register 30 has a logical-value-fixed region Ff composed of low-order bits with logical values fixed at "0", i.e. Bit 0 (B0) to Bit 25 (B25), and a logical-value-variable region Fv composed of high-order bits with variable logical values, i.e. Bit 26 (B26) to Bit 31 (B31). In the logical-value-fixed region Ff, output terminals of the respective bits are connected to a ground terminal of the circuit so as to output the logical value "0" at all times, for example. The logical-value-variable region Fv is arranged so that data can be written in the region through the PCI bus 16 by the PCI host machine. The data to be written in the region is represented as BAR written data (BARWD) in the drawing. Therefore, when the PCI host machine tries writing 32-bit data in the base address register 30 through the PCI bus 16, the data is actually written in the logical-value-variable region Fv, i.e. in B26 to B31 of 32 bits.

Figures 5, 6:
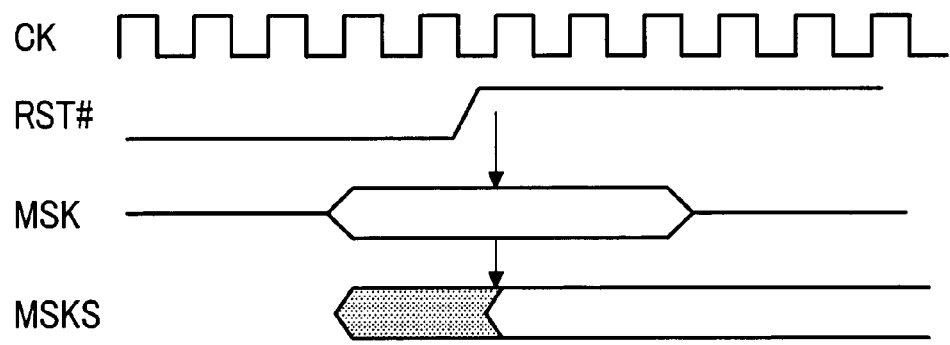
FIG. 5 is a table exemplarily showing the relation between the value of a mask signal and the size of a memory space set according to the mask signal value and the other relations.
FIG. 6 is a timing chart exemplarily showing the operation to accept a mask select signal.

The mask circuit 31 includes a mask signal output circuit 33 and a BAR data-limiting circuit (AND gate) 34. The mask signal output circuit 33 outputs a 3-bit mask signal 36 selected in response to a 2-bit mask select signal (MSKS) 35. The correspondence between the mask signal 36 and the mask select signal 35 is as shown in FIG. 5, for example. The AND gate 34 receives three bits of B26 to B28 in the logical-value-variable region Fv and a 3-bit mask signal 36 to produce a 3-bit logical product signal on bit-to-bit corresponding basis. Therefore, when the mask signal is "111," the AND gate 34 outputs B28, B27, and B26. When the mask signal is "110," the AND gate 34 outputs B28, B27, and 0. When the mask signal is "100," the AND gate 34 outputs B28, 0, and 0. Further, when the mask signal is "000," the AND gate 34 outputs 0, 0, and 0. Accordingly, when the PCI host machine tries reading out 32-bit data from the base address register 30 through the PCI bus 16, values fixed at "0" for B0 to B25 and three bits masked according to a mask signal for B26 to B28 are outputs, and for B29 to B31 the values which the base address register 30 holds are directly output at all times. In FIG. 1, the BAR read-out data (BARRD) means data read out from the base address register 30.

In the case where the number of mask bits having the logical value "0" is large, the number of bits having the fixed logical value "00" on the low-order side of the base address register 30 is increased as a whole. Conversely, in the case where the number of mask bits having the logical value "0" is small, the number of bits having the fixed logical value "0" on the low-order side is decreased as a whole. The size of the local address space capable of being mapped to the microprocessor 1 is proportional to all the number of bits having the fixed logical value "0" on the low-order side of the base address register 30. Therefore, the size of the local address space capable of being mapped to the microprocessor 1 is made variable according to the number of mask bits specified by the mask select signal 35.

Referring to FIG. 5 again, there is exemplarily shown the relation between the value of a mask signal and the size of a memory space which is set according to the mask signal. For example, when the mask signal is "111," B31 to B26 are unmasked bits in the logical-value-variable region Fv and therefore a memory space of 64 megabytes (MB) is set. When the mask signal is "000," B31 to B29 are unmasked bits and accordingly a memory space of 512 MB is set.

The latch circuit 32 enables the formation of a mask select signal 35 in a configuration cycle. For example, the latch circuit 32 is connected to a 2-bit mask select terminal MSK, a reset terminal RTS#, and a clock terminal CK. Values from the mask select terminal MSK and the reset terminal RTS# are input to synchronizing circuits 38, 39 in synchronization with clock signals from the clock terminal CK. Then, the input signal from mask select terminal MSK is accepted by a latch 40 in synchronization with the clocks in response to the release of reset according to changes of the high level of the reset signals RST#. The synchronizing circuits 38, 39 and the latch 40 are composed of D type latches, for example. The signal accepted by the latch 40 will make a mask select signal 35.

In this embodiment, there are four kinds of selectable memory space sizes because the mask select signal is of 2 bits. However, it is needless to say that the number of selectable memory space sizes can be made larger by changing the number of bits of the mask select signal. For example, in the case where the mask select signal is of one bit, two kinds of memory space sizes can be selected.

Referring to FIG. 6, there is illustrated a timing chart of the operation to accept the mask select signal. As clearly shown from the drawing, in the release of reset by the reset terminal RST#, the mask select signal (MSKS) 35 is latched by the latch circuit 32. As a result, in the subsequent configuration cycle the mask signal 36 has been already settled. Therefore, in the configuration cycle, the PCI host machine (HOST) writes the value "1" into all bits of the base address register 30 and then reads out the base address register 30. Thus, the PCI host machine can recognize the number of bits, into which the logical value "1", has not been written, based on the result of the reading and thus obtain the size of address space required by the PCI device (PCIDEV) 1 based on the resulting bit number. The PCI host machine performs address mapping with respect to an address space with the recognized size. The PCI host machine writes a leading address of the mapped address space into the configuration register 30 to complete the address mapping with respect to the PCI device 1. Then, the PCI device 1 is made operable in its normal operating condition using the mapped local address space.

The size of the address space that the device needs can be changed in the configuration cycle because the number of writable bits in the base register 30 can be changed with a mask select signal 35 during a period of reset time.

Figure 7:
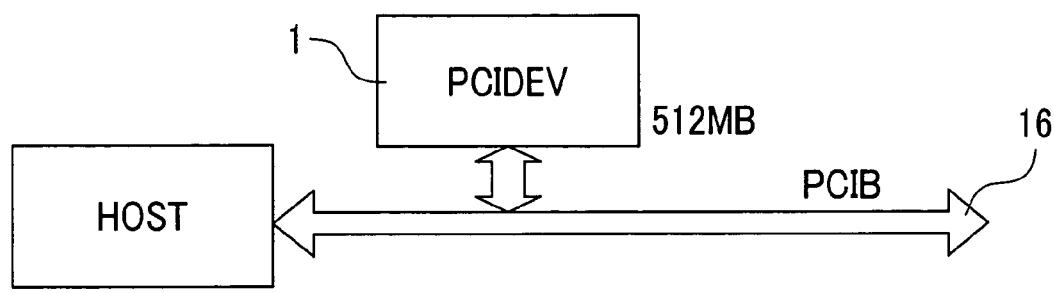
FIG. 7 is an illustration showing an example of the system configuration in the case where a single PCI device utilizes a memory space of 512 MB.
Figure 8:
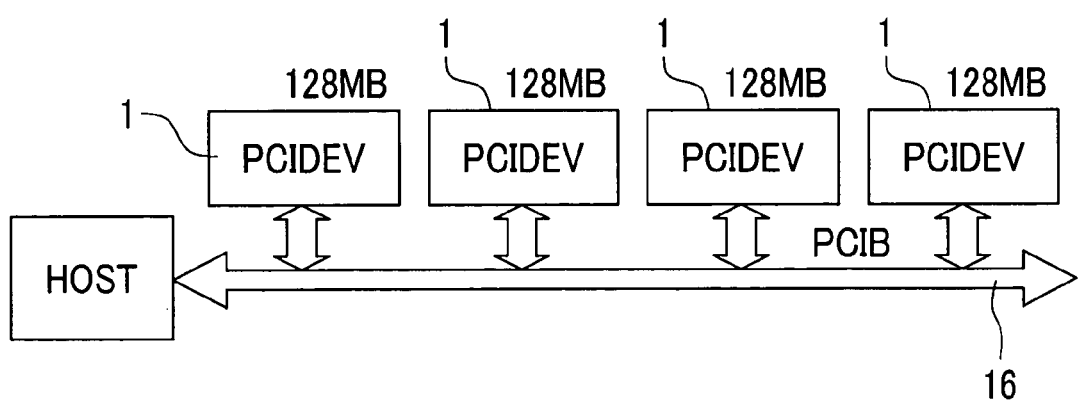
FIG. 8 is an illustration showing an example of the system configuration in the case where four PCI devices use a total of 512 MB memory space distributing processes.

Therefore, in the case where attempts are made to construct various systems, finite memory resources or address resources can be mapped flexibly. For example, also in the case where a plurality of PCI devices are used, the memory space to be mapped to each of the devices can be selectively reduced in size. Therefore, it is also possible to cope with the case where finite resources are mapped to many PCI devices to construct a system. It is possible to cope with the case where one microprocessor (PCI device (PCIDEV)) 1 uses a memory space of 512 MB as illustrated in FIG. 7, and the case where four microprocessors (PCIDEVS) 1 use a total of 512 MB distributing processes as illustrated in FIG. 8. Namely, it is possible to cope with the two types of system configurations without making any change on the microprocessors 1.

The invention that the inventor devised has been concretely described above based on the embodiments. However, it is needless to say that the invention is not so limited and various changes or modifications may be made within the scope of the invention without departing from the spirit of the invention. While in the above embodiments the reading side is masked, the writing side may be masked. Further, while the mask select terminal is a dual-purpose terminal, it may be a dedicated terminal if there are a sufficient number of pins. Also, dedicated external pins may be allotted if there are a sufficient number of pins.

In addition, the semiconductor integrated circuit is not limited to a microprocessor. It can be applied to various types of controllers for PCI bus interface control. Also, the invention is applicable to a compact PCI bus, etc.

The invention is applicable to devices which meet the condition where readable/writable bits for a base address register are made variable, or the condition where each device can accept mask control signals thereby to change the width of writable bits of the base address register at a time when the device is reset.

As described above, the advantages which can be provided by typical forms of the invention herein disclosed are briefly as follows.

The capacity of a local address space for a semiconductor integrated circuit can be made variable by making variable the number of readable or writable bits of the bits prepared for address mapping of a local address space in a base address register used for address mapping of a local address space. Thus, in cases where attempts are made to construct various systems, finite memory resources or address resources can be mapped flexibly.

Also, in the case where the width of writable bits in the base address register is specified at a time when the semiconductor integrated circuit is reset, it becomes possible to cope with the initial setting in a configuration cycle after reset of the semiconductor integrated circuit is released.

Therefore, it is possible to provide a semiconductor integrated circuit which can make a local address space variable and is improved in flexibility for resource mapping.

What is claimed is:

1. The semiconductor integrated circuit comprising a configuration circuit, to which resource mapping is defined from outside the circuit,
    said configuration circuit including: a base address register having a low-order multi-bit region with fixed logical values and a high-order multi-bit region with variable logical values, and utilized for address space mapping; and a limiting circuit for limiting writing and read-out with respect to a part of the multi-bit region on a high-order side of said base address register to the fixed logical value, the part capable of being varied in bit number,
    wherein said limiting circuit is a mask circuit for masking a part of the multi-bit region on the high-order side of said base address register into the fixed logical value based on a piece of mask control information, and
    further comprising a control circuit for controlling said configuration circuit,
    said control circuit controlling, in a configuration cycle after release of reset of the semiconductor integrated circuit, the operations of: holding inverted data of the fixed logical values input from outside the circuit in the rewritable high-order multi-bit region in said base address register; outputting outside a value held by said base address register through said mask circuit after the holding; and holding data input from outside the circuit in said base address register after the outputting.

2. The semiconductor integrated circuit according to claim 1, wherein said configuration circuit and the control circuit thereof constitute a PCI bus interface circuit.

3. The semiconductor integrated circuit according to claim 2, comprising a central processing unit capable of controlling said PCI bus interface circuit as an external interface circuit.

* * * * *